April 2, 1963       B. B. KINE ETAL       3,084,073
COPOLYMERS OF ALKYL ACRYLATE, METHOXYMETHYL VINYL
    SULFIDE, COMONOMER CONTAINING FUNCTIONAL
    GROUPS AND COATING COMPOSITIONS THEREOF
              Filed Dec. 10, 1959

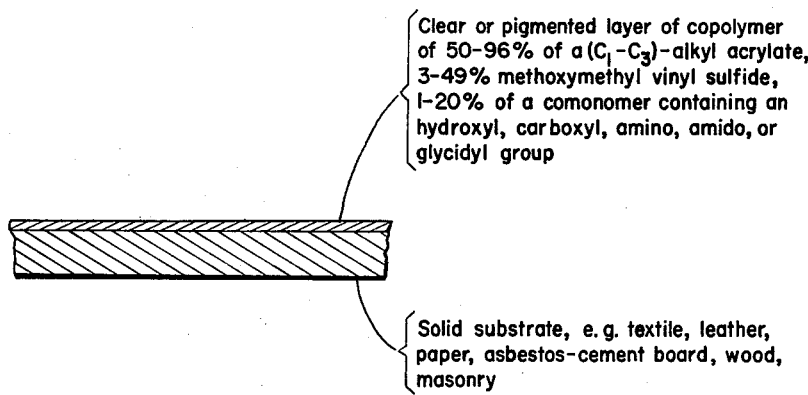

Clear or pigmented layer of copolymer of 50-96% of a ($C_1$-$C_3$)-alkyl acrylate, 3-49% methoxymethyl vinyl sulfide, 1-20% of a comonomer containing an hydroxyl, carboxyl, amino, amido, or glycidyl group Solid substrate, e.g. textile, leather, paper, asbestos-cement board, wood, masonry

INVENTORS
BENJAMIN B. KINE
JOHN KUCSAN

BY *Carl A. Castellan*

ATTORNEY 3,084,073
COPOLYMERS OF ALKYL ACRYLATE, METHOXY-METHYL VINYL SULFIDE, COMONOMER CONTAINING FUNCTIONAL GROUPS, AND COATING COMPOSITIONS THEREOF
Benjamin B. Kine, Elkins Park, and John Kucsan, Philadelphia, Pa., assignors to Rohm & Haas Company, Philadelphia, Pa., a corporation of Pennsylvania
Filed Dec. 10, 1959, Ser. No. 858,595
20 Claims. (Cl. 117—161)

This invention relates to novel copolymers and thermosetting compositions adapted for the impregnation and/or coating of various substrates. It is particularly concerned with aqueous compositions comprising certain emulsion copolymers which may or may not contain water-dispersible polyfunctional agents reactive with the copolymers and are adapted to be employed as a composition for producing thermoplastic or thermosetting coatings whether clear or pigmented and thermoplastic or thermosetting impregnants useful for bonding, adhesive, laminating or other purposes.

It is an object of the present invention to provide improved coating compositions which are resistant to ultraviolet light so that they are adapted to be exposed to sunlight without suffering undue deterioration thereby. Another object of the present invention is to provide compositions comprising aqueous dispersions of acid, neutral, or alkaline emulsion copolymers which may or may not contain water-dispersible polyfunctional agents reactive with the copolymers which are adapted to form coatings of either thermoplastic or thermosetting character. Another object of the invention is to provide aqueous dispersions of emulsion copolymers which may or may not contain water-dispersible polyfunctional agents reactive with the copolymers characterized by excellent mechanical stability and improved capacity for the incorporation of pigments therein without loss of stability. Another object of the invention is to provide aqueous dispersions of emulsion copolymers which may or may not contain water-dispersible polyfunctional agents reactive with the copolymers adapted to form durable coatings, especially those obtained in conjunction with certain cross-linking resins. Other objects and advantages of the compositions of the invention will be apparent from the description thereof hereinafter.

Poly(methyl methacrylate) is highly regarded as a coating material because of its durability and resistance to ultraviolet light. It can undergo prolonged outdoor exposure without such manifestations of degradation as crazing and discoloration and it is especially resistant to loss of gloss and color, particularly when pigmented. It is quite a hard, stiff material which is entirely suitable for the coating of rigid substrates.

In many coating applications where a softer flexible material is needed, such as in the coating of flexible substrates, such as paper, textiles, and leather, the methyl methacrylate is either copolymerized in a minor proportion with a major proportion of one or more esters of acrylic acid or is entirely replaced by a polymer of one or more esters of acrylic acid. Such acrylic acid ester homopolymers or copolymers with or without methyl methacrylate are highly resistant to ultraviolet light when the acrylic acid ester component is composed largely of the esters with alcohols having at least 4 carbon atoms, and especially those having 8 to 18 carbon atoms. However, when the relatively inexpensive, most readily available esters of acrylic acid with ethanol and methanol are employed as a major component in the polymers, the resistance to degradation by ultraviolet light is relatively poor. This is particularly disadvantageous in such applications as the pigment-printing and pigment-dyeing of textiles which are subjected to frequent launderings with intervening exposure to sunlight wherein progressive fading occurs as a result of the degradation of the polymeric binder with consequent removal of both binder and pigment.

A single FIGURE of the drawing is a cross-sectional view of a coated article prepared in accordance with the present invention in which view the layers of substrate and coating are greatly enlarged.

In accordance with the present invention, it has been discovered that copolymers formed of 50% by weight or more of the monomers ethyl acrylate, methyl acrylate, or propyl acrylate, which may be represented by the generic formula $$CH_2=CHCOO(CH_2)_{n-1}CH_3 \qquad (I)$$

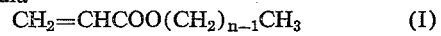

wherein $n$ is an integer having a value of 1 to 3, can be rendered practically resistant to ultraviolet light by the inclusion in the copolymer of about 3 to 49% by weight of a vinyl sulfide of the formula $$CH_2=C(R)-S-R'-O-R'' \qquad (II)$$

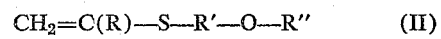

in which R is a hydrogen atom or a methyl group, R' is a methylene, ethylidene or isopropylidene group having respectively the structures, $$-CH_2-, \quad -\overset{CH_3}{\underset{|}{CH}}-, \quad \text{and} \quad CH_3-\overset{CH_3}{\underset{|}{C}}-CH_3$$

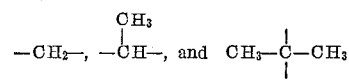

and R'' is an alkyl group containing one to eight carbon atoms.

The inclusion of as little as about 3% by weight of the vinyl sulfide above has been found to improve the ultraviolet resistance appreciably and may be adequate for practical purposes if the copolymer also contains substantial amounts of one or more of methyl methacrylate, butyl acrylate, 2-ethylhexyl acrylate, or other acrylates of alcohols having 4 to 18 or more carbon atoms. However, for most practical purposes, at least 10% by weight of the vinyl sulfide is used, and the preferred range of vinyl sulfide is from about 10% to 49% by weight in the copolymer, since practical resistances are obtainable with such amounts without the use of the expensive higher alcohol acrylates.

The copolymers used in the present invention also contain about 1 to 20% by weight, preferably about 2 to 8% by weight, of monomers having functional groups, especially those containing reactive hydrogen including amido and amino groups having primary and secondary nitrogen atoms, thiol or hydroxyl (alcoholic or phenolic) and carboxyl either in free acid form or in the form of a salt especially with ammonium or an alkali metal hydroxide, such as of sodium, potassium, or lithium, or a volatile, water-soluble amine. Examples of such monomers include: acids, such as acrylic acid, methacrylic acid, itaconic acid; amides, such as acrylamide, methacrylamide, N-methylol - methacrylamide, N-methoxymethyl-methacrylamide, N-methyl-acrylamide, β-ureidoethyl acrylate or methacrylate, β-ureidoisobutyl vinyl ether or sulfide; amines, such as β-aminoethyl vinyl ether, β-aminoethyl vinyl sulfide, β-dimethylaminoethyl acrylate or methacrylate, 4-vinylpyridine, 2-vinylpyridine, and 2-methyl-5-vinylpyridine; alcohols such as β-hydroxyethyl acrylate, methacrylate, vinyl ether, or vinyl sulfide; and β-methacryloxyacetamidoethyl-N,N'-ethyleneurea.

Copolymers containing carboxyl groups may be used in the acid form or they may be neutralized partly or completely, such as with an alkali metal hydroxide or a water-soluble amine. Such neutralization may be employed to adjust the viscosity of aqueous dispersions of water-insoluble emulsion copolymers containing such acid groups. Copolymers containing amine groups may be used on the alkaline side or they may be neutralized partly or completely with an acid.

The copolymer may also contain up to 46% by weight of one or more other copolymerizable monoethylenically unsaturated compounds, examples of which include methyl methacrylate, ethyl methacrylate, butyl methacrylate, esters of methacrylic acid with other alcohols having 3 to 18 carbon atoms, acrylonitrile, methacrylonitrile, vinyl acetate, styrene, esters of acrylic acid with an alcohol having 3 to 18 carbon atoms, vinyl chloride, and vinylidene chloride.

The copolymers of the present invention may be prepared by bulk, solution, emulsion, or suspension technique. Solution copolymerization may be effected in toluene, xylenes, n-butanol, cyclohexanol, dimethylformamide, and mixtures of such solvents.

The polymerization may be effected with the aid of a free-radical initiator or catalyst, such as an organic or inorganic peroxide catalyst, peroxy catalysts, such as persulfates, and the azo catalysts. From 0.1% to 3% or more of the initiator or catalyst may be used, based on the total weight of the monomers. To provide a high molecular weight, it is preferred to use from 0.5% to 1% of the initiator. Examples of organic peroxide catalysts that may be used include benzoyl peroxide, acetyl peroxide, caproyl peroxide, butyl perbenzoate, butyl hydroperoxide. Examples of azo catalysts include azodiisobutyronitrile, azodiisobutylramide, dimethyl or diethyl or dibutyl azodiisobutyrate, azobis($\alpha,\gamma$-dimethylvaleronitrile), azobis($\alpha$-methylbutyronitrile), azobis($\alpha$-methylvaleronitrile), dimethyl or diethyl azobismethylvalerate, and the like.

In the case of emulsion polymerization particularly, a redox system is extremely effective. Here an organic peroxide or hydroperoxide may be used or an inorganic peroxide such as hydrogen peroxide, ammonium persulfate, sodium persulfate, or potassium persulfate in amounts similar to those stated above. The peroxidic catalyst is effectively coupled with a reducing agent such as an alkali metal sulfite, bisulfite, or metabisulfite, or hydrosulfite, or hydrazine. The action of the redox system may be controlled through use of a chain-transfer agent or regulator, such as mercaptoethanol or other mercaptan. Such regulator also finds use outside of redox systems with organic or inorganic peroxides and with azo catalysts, such as azodiisobutyronitrile, azodiisobutyramide, or diethyl azodiisobutyrate.

The preferred thermosetting compositions of the present invention comprise a copolymer as described above and from about 1 to 25% by weight, based on the weight of the copolymer, of a polyfunctional agent reactive with the functional groups of the copolymer. Examples of the latter include aliphatic and aromatic polyisocyanates, polyepoxides, phenol-formaldehyde condensates, and aminoplasts. Compositions comprising the copolymer without the polyfunctional agent may be used for purposes where either thermoplastic or thermosetting properties are desired, depending on the manner of use.

The compositions may be applied as solutions in such organic solvents as toluene, xylenes, n-butanol, dimethylformamide, or mixtures thereof. If desired, the copolymers may be initially prepared in the solvent by which the compositions comprising them are intended to be applied in coating, impregnation, and the like. Again, the copolymers, with or without the polyfunctional agents, may be applied as aqueous dispersions obtained by emulsion copolymerization. The copolymer and polyfunctional agent may also be blended or mixed without a solvent and applied for casting, if liquid, or by hot-melt coating or impregnation, if solid.

Thermosetting compositions prepared by mixing a water-soluble polyepoxide or aminoplast with an aqueous dispersion of a water-insoluble emulsion copolymer of the constitution defined above are especially useful. Preferred aminoplasts include water-soluble or self-dispersible condensates of formaldehyde with urea, N,N'-ethyleneurea, aminotriazines, and certain triazones or the ethers of such condensates obtained by reaction with methyl alcohol. Thus, penta-methylol or hexa-methylol melamine or a methylated penta-methylol or hexa-methylol melamine condensates obtained by etherification with methyl alcohol may be used. The 5-substituted-tetrahydro-s-triazones-2 of the following formula may also be used:

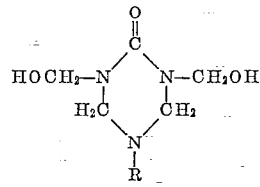

(III)

where R is selected from the group consisting of 2-hydroxyethyl, 2-hydroxypropyl, and alkyl groups having 1 to 4 carbon atoms.

In the aqueous dispersions, water-soluble polyepoxides of the Formulas IV, V, and VI are particularly useful:

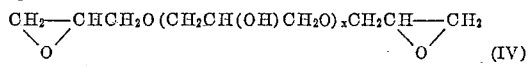

(IV)

where $x$ is a number having an average value of 1 to 3;

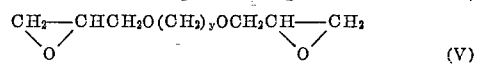

(V)

where $y$ is a number having an average value of 2 to 4; and

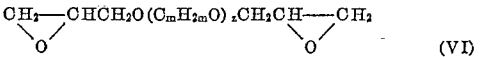

(VI)

where $m$ is an integer having a value of 2 to 4, and $z$ is a number having an average value of 1 to 5.

Aqueous dispersions of the copolymers of the present invention may be prepared by emulsifying and then copolymerizing with the aid of a free-radical addition polymerization initiator or catalyst a mixture of the monomers specified above in the proportions specified. The emulsification and polymerization may be assisted by the use of an emulsifying agent either of anionic, non-ionic, or cationic type of suitable mixtures thereof. Such agent or agents also serve to stabilize the dispersion of the copolymer after completion of the polymerization. The proportion of emulsifier may be from about 1 to 6% based on the total weight of monomers. The proportion of initiator may be 0.1% to 3% by weight, based on the weight of monomers. The molecular weight of the copolymers may range from about 10,000 to as high as several million such as 5,000,000 to 10,000,000.

The temperature of polymerization of the emulsified monomers may be from 0° to about 100° C., preferably from about 30° to 80° C.

Peroxidic free-radical catalysts, particularly catalytic systems of the redox type, are recommended. Such systems, as is well known, are combinations of oxidizing agents and reducing agents such as a combination of potassium persulfate and sodium metabisulfate. Other suitable peroxidic agents include the "per-salts" such as the alkali metal and ammonium persulfates and perborates, hydrogen peroxide, organic hydroperoxides such as tert-butyl hydroperoxide and cumene hydroperoxide, and esters such as tert-butyl perbenzoate. Other reducing agents include amines, such as triethylamine, tetraethylene pentamine, water-soluble thiosulfates and hydrosulfites and the salts, such as the sulfates, of metals which are capable of existing in more than one valence state such as cobalt, iron, nickel, and copper. The most convenient method of preparing the dispersions of copolymers comprises agitating an aqueous suspension or emulsion of a mixture of copolymerizable monomers and a redox catalytic combination at room temperature without the application of external heat. The amount of catalyst can vary but for purposes of efficiency from 0.01% to 3.0%, based on the weight of the monomers, of the peroxidic agent and the same or lower proportions of the reducing agent are recommended. In this way, it is possible to prepare dispersions which contain as little as 1% and as much as 60% or even more of the resinous copolymer on a weight basis. It is, however, more practical, and hence preferred, to produce dispersions which contain about 30–50% resin-solids.

In the case of emulsion polymerization, examples of suitable non-ionic emulsifiers include the higher alkyl phenoxypolyethoxyethanols in which the alkyl group has from 6 to 18 carbon atoms, such as octyl, dodecyl, or octadecyl, and there may be from 8 to 50 or more oxyethylene units. Examples of anionic emulsifiers include the higher fatty alcohol sulfates, such as sodium lauryl sulfate; examples of cationic emulsifiers include higher alkyl pyridinium salts such as lauryl pyridinium chloride, (octylbenzyl)trimethylammonium chloride, and so on.

The copolymer dispersions thereby obtained may be employed directly with or without dilution with water, either with or without an aminoplast or polyepoxide dissolved or dispersed in the copolymer dispersion, for the coating of such materials as paper, leather, textiles, ceramics, and metals which may be either bare or primed with known commercial primers. They may also be employed for the coating of stone, cement, concrete, bricks, asbestos cement shingles, cinder block, and other masonry surfaces which are ordinarily subjected to moist conditions during use for the purpose of providing water-resistant coatings thereon. Such coatings serve to prevent the leaching of calcium, magnesium, and other salts normally present in the cementitious types of products which ordinarily cause efflorescence, that is the formation of a white disfiguration or discoloration at the surface of the products on wetting.

In general, the aqueous dispersions or organic solvent solutions of the copolymers, either with or without an aminoplast or polyepoxide dissolved or dispersed in the copolymer dispersion or solution, may be employed as a clear composition to provide a thin, clear, glossy transparent coating of highly decorative nature. If desired, however, dyes, fillers, or pigments can be included, the amount varying in dependence upon the particular purpose for which the composition is intended to prepare waterbase paints or like compositions. Examples of water-insoluble pigments which may be used include azo pigments and lakes, phthalocyanine pigments, vat dyestuffs in their water-insoluble form, and inorganic pigments such as carbon black, iron oxides, chrome yellows, titanium dioxide, and lithopone. Powdered or flaked metals may also be included, such as aluminum, bronze, brass, chromium, or gold. Mixtures may be used if desired. The proportion of pigment used may vary from about 5 to 100% by weight, based on the weight of the copolymer.

The compositions containing a polyfunctional agent, and especialy an aminoplast or polyepoxide, may be used for the stabilization of wool fabrics against shrinkage on washing, as binders for the fibers in non-woven fabrics, and as backcoatings for various types of fabrics, such as pile fabrics especially those intended to be used for rugs, giving body to the fabrics and preventing ravelling.

The compositions containing a polyfunctional agent, and especially an aminoplast or polyepoxide, are particularly useful in the preparation of pigment-printing and pigment-dyeing compositions for application to textile fabrics. In the printing or dyeing of textiles, it has been found that the use of the copolymers defined herein provide outstanding capacity for insolubilization by the polyfunctional agent as well as improved resistance to light and resistance to successive exposures to light and washing. The employment of appreciably more than 25% by weight of the vinyl sulfide, however, is generally undesirable for this type of application because of undue stiffness and brittleness in the coating so that it is incapable of remaining on the fabric during normal usage in which repeated flexing occurs. Preferably, 8 to 20% or less of the vinyl sulfide is used when flexibility rather than stiffness is desired.

In all of the uses to which the thermosetting compositions of the invention (containing 1 to 25% of polyfunctional agent) are put they can be insolubilized and thereby rendered quite durable either by drying with or without ageing at room temperature, by prolonged subjection to the normal atmosphere in high temperature climates, or by heating the articles coated or impregnated with the polymer coatings described herein to a temperature of 200° F. to 750° F. or higher for periods of time from a few seconds at the higher limit of the temperature range mentioned up to an hour or more at the lower portion thereof. Temperatures of 290° to 310° F. for 10 to 20 minutes are quite satisfactory. An acidic catalyst to accelerate this insolubilization may be included as described hereinafter. The insolubilization or thermosetting quality, in some cases, may not require coreaction with a polyfunctional agent.

The preferred thermosetting coating compositions may simply be obtained by the dissolution of a formaldehyde condensate within the aqueous dispersion of the emulsion copolymer prepared as indicated above. In addition, an acidic catalyst is preferably also dissolved in the aqueous dispersion of the copolymer and condensate.

As stated, the aqueous coating composition may contain a small proportion ranging from about 0.1% to 2% by weight of the aqueous composition of an acidic catalyst to accelerate the condensation of the coating to insoluble and infusible condition. By insoluble, at this point, is meant insolubility not only in water but in organic solvents in general. Examples of the acid catalyst are ammonium phosphate, ammonium thiocyanate, boron trifluoride ethyl etherate, hydrochloric or other acid salts of a hydroxyaliphatic amine including 2-methyl-2-aminopropanol, 2-methyl-2-amino-1,3-propandiol, tris(hydroxymethyl)aminomethane, 2-phenyl-2-amino-1-propanol, 2-methyl-2-amino-1-pentanol, 2-amino-butanol, triethanolamine, 2-amino-2-ethyl-1-butanol, also ammonium chloride, pyridine, hydrochloride, benzyldimethylamine oxalate. The amine salts are water-soluble latent catalysts substantially neutral at ordinary temperature but dissociate into volatile components one of which is acidic at the elevated temperatures used for baking and curing, so that the catalyst after exerting its accelerating effect is automatically discharged during the heating or curing stage.

In addition to the other ingredients, the aqueous dispersions may contain a water-soluble thickening agent, such as gum tragacanth, water-soluble cellulose ethers, polyvinyl alcohol or partially saponified polyvinyl acetate. The aqueous dispersions may contain a mild alkali, for example, sodium acetate, sodium carbonate, chalk, morpholine, N-methylmorpholine, triethylamine, or ammonia, including if desired, a mixture of water-soluble substances which form a conventional mildly alkaline buffer. The proportions of the several ingredients in the aqueous dispersions can be varied widely, and they are adjusted in any convenient manner so that the dispersions or pastes have a consistency suitable for application by the particular technique to be employed for this purpose.

When organic solvent solutions of the copolymers are employed, one of the aminoplast condensates may be alkylated with an alcohol of 3 to 6 carbon atoms, especially n-butanol, to impart solubility in the organic solvent used. Instead of aminoplast condensates, polyisocyanates, such as hexamethylene-1,6-diisocyanate, toluene-2,4-diisocyanate, and p-phenylene diisocyanate, can be used in this type of system.

Polyepoxides may be used in either the aqueous dispersions or in the organic solvent solutions to cross-link the copolymers especially those containing amine or carboxyl groups. In the organic solvent solutions of the copolymers, examples of the organic solvent-soluble polyepoxides that may be used include glycol-bis-exo-dihydrodicyclopentadienyl ethers having the general formula:

$$O'=C_{10}H_{13}-O-R-O-C_{10}H_{13}=O' \qquad (VII)$$

in which $=C_{10}H_{13}=$ is the radical of exo-dihydrodicyclopentadiene, the two O' groups are oxygen atoms which together with two adjacent carbon atoms in the $=C_{10}H_{13}=$ radicals form oxirane rings, and R is either (a) an alkylene group of 2 to 12 carbon atoms or (b) a radical of an etherified polyalkylene glycol, which radical has the formula $(R'-O-)xR'$ in which R' is an alkylene group of 2 to 4 carbon atoms and $x$ is an integer having a value of 1 to 8 inclusive. These compounds and their production are described in U.S. Patent 2,543,419. There may also be used the "ethoxyline resins" available under the trade names of Epon or Araldite resins. They are polyether derivatives of a polyhydric phenol containing epoxy groups and may be prepared by effecting reaction between a polyhydroxy phenol or alcohol, for example, hydroquinone, resorcinol, glycerine, or condensation products of phenols with ketones, for instance, bis-(4-dihydroxydiphenyl)-2,2-propane, with epichlorohydrin. For example, the reaction of epichlorohydrin with bis-(4-hydroxyphenyl)-2,2-propane may be formulated as follows:

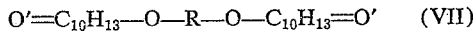

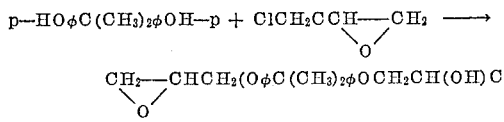
(VIII)

where  is the phenylene group and n has an average value varying from around zero to about 7. These resins may be made by the method disclosed in 2,324,483, 2,444,333, British Patents 518,057 and 579,698.

After application of the preferred thermosetting coating or impregnating compositions of the present invention to whatever substrate is involved, the coated or impregnated material is dried either by simple exposure to the ambient atmosphere or by being subjected to elevated temperatures such as up to 140° to 180° F. Thereafter, the coated material may be subjected to a baking or curing operation involving the subjection thereof to a temperature from about 240° F. up to 750° F. for a time which is inversely proportional to the temperature. For example, at the lower range of temperature the time may be from three-fourths of an hour to somewhat over an hour, such as 1¼ hour in duration; whereas at the upper portion of the temperature range, the time may be on the order of ten seconds to five minutes in duration. In an intermediate preferred range of about 290° to 310° F., a time period of about 10 minutes to 20 minutes may be employed. The heating operation serves to render the coating composition insoluble in organic liquids as well as water and also infusible. The upper limit of temperature and its duration should be so selected and correlated as to avoid decomposition or other damage to the coated or impregnated article. In some cases, insolubilization can be obtained by ageing at room temperature without need for a heating step.

The compositions comprising both the copolymer and the polyfunctional agent may be applied to any of the substrates mentioned hereinabove in connection with the thermoplastic coating composition such as wood, leather, paper, metals either bare or prime, textiles, masonry surfaces of the type mentioned hereinabove, and plastics surfaces which are not deformed or decomposed at the temperature required for baking or curing.

The compositions may be applied to the substrates in any suitable manner such as by spraying, brushing, rollercoating, dipping, knife-coating, and so on. Excess of the applied material may be wiped by any suitable squeegeeing operation such as between pressure rollers, by air squeegeeing, or by a knife or doctor blade. Thereafter, the coating may be dried as stated hereinabove. Besides simple air-drying, there may be employed for this purpose heated air as in an oven or tunnel drier, radiation such as by infra-red lamps or electrical induction either of electromagnetic or electro-static high frequency induction fields. When a baking or curing operation as mentioned hereinabove is applied, it may be accomplished by the use of any suitable heating devices such as infra-red lamps or electromagnetic or electro-static high frequency induction devices.

When the coating compositions are applied to substrates having reactive groups, such as paper or textiles formed of cellulosic or proteinaceous fibers, it is believed that when the copolymers containing certain functional groups are used the substrate takes part in the reaction during curing and baking so that the copolymer (and the formaldehyde condensate, or polyisocyanate, or polyepoxide if present) and the substrate are combined chemically, whereby outstanding adhesion, durability, and resistance to water, washing, laundering, and solvents including those used for dry-cleaning are obtained.

In the following examples which are illustrative of the invention, the parts and percentages are by weight unless otherwise specifically indicated.

*Example 1*

(a) An aqueous dispersion of a copolymer was obtained by the emulsion copolymerization at 60° C. of a mixture of 2 parts of itaconic acid in 200 parts of water neutralized to a pH of 7.0, 10 parts of methoxymethyl vinyl sulfide, and 88 parts of ethyl acrylate, emulsified in the presence of 0.25 part of tetrasodium pyrophosphate, 0.5 part of ammonium persulfate, and 0.5 part sodium hydrosulfite, by 3 parts of an ethylene oxide condensate of a t-octylphenol containing about 40 oxyethylene units per molecule which served not only as an emulsifier for the monomers but also as a dispersing agent for the copolymer. A reaction temperature of 60° C. was maintained for 3 to 4 hours. Thirteen parts of methyl methacrylate monomer were then added with stirring. One-half hour later there were added to the reaction 0.14 part of potassium persulfate followed by 0.16 part of sodium bisulfite. After cooling the composition was diluted with 300 parts of water and the diluted dispersion was then sprayed upon an automotive upholstery leather as a topcoat. The leather was dried at 140° F. A permanent, flexible nonyellowing finish was obtained.

(b) To a piece of side leather which had been coated with a base coat of a polymer of an acrylic ester, a topcoat was then applied by spraying onto the leather a mixture composed of:

| | Parts |
|---|---|
| Water | 71.9 |
| NH₄Cl | 0.05 |
| The polymeric dispersion of part (a) | 50 |
| Dimethoxymethylpolymethylolmelamine | 3.1 |

The treated leather was dried at 80° F. for 3 hours, then it was smooth plated at 150° to 155° F. for 3 seconds. The finished leather withstood wet crocking, water spotting, and a 50,000 cycle flex-test. It was also unaffected by exposure to sunlight.

(c) To a piece of side leather which had been coated with a base coat of a polymer of an acrylic ester, a topcoat was then applied by spraying onto the leather a mixture composed of:

| | Parts |
|---|---|
| 2-ethoxyethanol | 50 |
| Dioxane | 29 |
| Copolymer of 88% of ethyl acrylate, 10% of methoxymethyl vinyl sulfide, and 2% of N-tert-butyl-(β-aminoethyl vinyl ether) | 20 |
| 1,6-diisocyanatohexane | 1 |

The treated leather was dried at 80° F. for 3 hours, then it was smooth plated at 150° to 155° F. for 3 seconds. The finished leather withstood wet crocking, water spotting, and a 50,000 cycle flex-test. It was also unaffected by exposure to sunlight.

*Example 2*

An aqueous dispersion of a copolymer was obtained by the emulsion copolymerization at 60° C. of 12 parts of methoxymethyl vinyl sulfide, 85.5 parts ethyl acrylate, 1.14 parts methacrylamide, and 1.36 parts methylol methacrylamide in 200 parts of water in the presence of 0.25 part of tetrasodium pyrophosphate, 0.5 part of ammonium persulfate and 0.5 part sodium hydrosulfite, by 3 parts of an ethylene oxide condensate of a t-octylphenol containing about 40 oxyethylene units per molecule. A reaction temperature of 60° C. was maintained for 3 to 4 hours. The pH of the polymeric dispersions was adjusted to pH=10.0 with triethylamine.

*Example 3*

(a) An aqueous dispersion of an emulsion copolymer of 45 parts of ethoxymethyl vinyl sulfide, 53 parts of ethyl acrylate, and 2 parts of methacrylamide was prepared as in Example 2.

(b) Forty parts of the dispersion obtained in Example 2 were admixed with 10 parts of the mixture described in part (a) hereof. The polymer dispersion thus obtained was applied to paper products as follows:

Pieces of 20-mil chipboard (bakery board coated on one side) were roller-coated on the chip side with the polymer dispersion so as to provide a coating of 3 to 4 pounds of dispersion solids per thousand square feet of chipboard. Pieces of kraft bag paper and wallpaper were treated in the same manner. The coatings dried rapidly at 210° F. They were resistant to oils, fats, and greases. They repelled water and, when exposed to sunlight for long intervals of time, they did not discolor or pick up dirt and soil.

*Example 4*

A solution composed of 10 parts of a resin-forming dimethoxymethylpolymethylolmelamine condensate, 20 parts of diethyl phthalate, and 1.7 parts of triethylamine were added to the composition described in Example 3(a). The mixture was then diluted with 100 parts of water and sprayed onto an asbestos-cement sheet so that 2 to 3 grams of resin solids per square foot were applied. The coated sheet was then dried at 130° C. for 5 minutes.

A second series of asbestos-cement sheets were sprayed with a mixture composed of 40 parts of the polymer dispersion prepared in Example 2, 10 parts of the polymer dispersion prepared in Example 3(a), and 10 parts of water. One and one-half to 2.5 grams of resin solids per square foot were applied. The sheets were then dried for 16 hours at 95° C.

Sheets so coated may be stacked to a height of 2 to 3 feet without evidencing blocking. These sheets repelled water and after outdoor exposure, were essentially unchanged in appearance. They showed no efflorescence, collected no dirt, and evidenced no fading; whereas uncoated shingles or shingles containing no alkoxymethyl vinyl sulfide in the copolymer of the coating appeared faded, dirty, and somewhat lighter in color.

*Example 5*

An aqueous dispersion of a copolymer was obtained by the emulsion copolymerization as in Example 2 of 10 parts of methoxymethyl vinyl sulfide, 88 parts of ethyl acrylate, and 2 parts of methacrylamide.

A textile dyeing composition was prepared by mixing:

9 parts of the 33% solids copolymer dispersion
1.2 parts of a 50% aqueous solution of dimethoxymethyltrimethylol melamine
2.5 parts of a copper phthalocyanine blue pigment available under the trade-name Monastral Blue BFR
5 parts of a 1% aqueous solution of t-octylphenoxypolyethoxyethanol having about 10 oxyethylene units per molecule
15 parts of sodium alginate (0.5% aqueous solution)
Water to make 100 parts total dispersion Then the mixture was adjusted to a pH of 8 to 9 with ammonium hydroxide.

A sample of 80 x 80 cotton percale was passed with one dip and one nip through the above dyeing composition. It was then framed, dried for 5 minutes at room temperature, then heated for 10 minutes at 300° F.

*Example 6*

An aqueous dispersion of a copolymer was made as in Example 2 by the emulsion copolymerization at 60° C. of 10 parts of methoxymethyl vinyl sulfide, 88 parts of ethyl acrylate, and 2 parts of itaconic acid. The composition was neutralized with dilute sodium hydroxide to a pH of 7.1, mixed with 15 parts of a polyepoxide of Formula IV in which $x$ has an average value of 3.5, and was then diluted with 300 parts of water and sprayed upon a non-woven textile fabric formed of three superposed carded webs of cotton fibers. The sprayed fabric was then dried ten minutes at 140° C. to bind the fibers in the fabric. A permanent, flexible, non-yellowing fibrous product was obtained which was resistant to ultraviolet light and to laundering.

Similar fibrous products were bonded with a mixture of the same polyepoxide with a similarly prepared copolymer of 88% n-propyl acrylate, 2% β-hydroxyethyl methacrylate, and 10% methoxymethyl vinyl sulfide.

The n-propyl acrylate may be replaced by isopropyl acrylate in the composition just described.

*Example 7*

(a) An aqueous dispersion of an emulsion copolymer of 10.5 parts of methoxymethyl vinyl sulfide, 75 parts of ethyl acrylate, 12 parts of 2-ethylhexyl acrylate, and 2.5 parts of glycydyl methacrylate was prepared as in Example 2. An aqueous coating was prepared containing 5% by weight of this copolymer, 0.5% of dimethoxymethyl-urea, 0.5% of a copper phthalocyanine blue pigment, 0.11% of ammonia, 0.05% of an ethylene oxide condensate of t-octylphenol containing about 10 oxyethylene units, 0.075% of sodium alginate, and 0.20% of the hydrochloride of 2-methyl-2-aminopropanol-1. Ammonium hydroxide was added to this composition to adjust the pH to about 8.5.

(b) A piece of 80 x 80 cotton sheeting was passed through the pigment dispersion and was then passed through the nip of a pair of squeeze rolls. It was supported on a frame and dried by exposure to the ambient atmosphere for 5 minutes. It was then cured while still on the frame for 10 minutes at 300° F. The fabric remained soft and flexible. It showed good resistance to washing and laundering (tested by washing 40 minutes in 0.1% sodium stearate at 180° F. while tumbling, followed by several ten-minute rinses in water); it was resistant to dry-cleaning by the use of perchloroethylene; it exhibited practical resistance to crocking; and its resistance to washing remained substantially unaffected even after exposure to ultraviolet light (tested by a so-called "cyclic ageing" test involving exposure to ultraviolet light in a FadeOmeter for 50 hours followed by the washing test described above).

(c) Similar results were obtained when the procedure of parts (a) and (b) was repeated except that the glycydyl methacrylate was replaced with β-aminoethyl methacrylate (10.5 parts).

*Example 8*

A pile fabric used in upholstery and having a base fabric of cotton and a pile of viscose rayon and cellulose acetate was back-coated with a paste consisting of 100 parts of a 46% solids emulsion copolymer of about 10% of methoxymethyl vinyl sulfide, about 87.5% of ethyl acrylate, and about 2.5% of itaconic acid and 100 parts of a 4% solution in water of methyl cellulose adjusted to a pH of 8.5 with ammonia. The fabric was dried 10 minutes at 250° F. and cured 10 minutes at 300° F.

A similar pile fabric was similarly back-coated with a copolymer of about 10% of methyl methacrylate, about 87.5% of ethyl acrylate, and about 2.5% of itaconic acid.

Duplicate samples of each fabric were exposed to ultraviolet light in the FadeOmeter for 120 hours, then washed with 0.1% t-octylphenoxypolyethoxyethanol (about 10 oxyethylene units) plus 30% NaCl on weight of ballast, made up of 10 towels plus 4 samples, liquor ratio 40:1, at 200° for 1 hour.

The fabric carrying the methoxymethyl vinyl sulfide back-coating exhibited relatively slight fraying resulting from ravelling, whereas the other fabric was badly frayed.

*Example 9*

Example 1 is repeated except in part (a) the ethyl acrylate was replaced with 88 parts of methyl acrylate and in part (b) the melamine condensate was replaced with 4 parts of a polyepoxide of formula IV in which $x$ has an average value of 1.3.

*Example 10*

(a) An aqueous dispersion of a copolymer was obtained by the emulsion copolymerization at 60° C. of 45 parts of methoxymethyl vinyl sulfide, 202.5 parts of ethyl acrylate, 45 parts of methyl methacrylate, and 7.5 parts of β-methacryloxy-acetamidoethyl - N,N'-ethyleneurea in 350 parts of water in the presence of 1.5 part of ammonium persulfate and 1.5 part sodium hydrosulfite, by 9 parts of an ethylene oxide condensate of a t-octylphenol containing about 40 oxyethylene units per molecule. A reaction temperature of 60° C. was maintained for 3 to 4 hours. The pH of the polymeric dispersions was adjusted to pH=8.5 with ammonium hydroxide.

(b) There are mixed and ground in a pebble mill 190 parts of titanium dioxide and 190 parts of zinc oxide in 189.5 parts of water containing 7.2 parts of diethylene glycol and as dispersing agents 3.8 parts of the sodium salt of a maleic anhydride/diisobutylene copolymer having a number average molecular weight of 3,000 and 1.9 parts of an octylphenoxypolyethoxy-ethanol containing an average of about 11 oxyethylene units. When this mixture has been ground to a smooth, uniform paste, it is mixed with 516.0 parts of a dispersion of the interpolymer, which contains 46% solids, prepared by the procedure of part (a) hereof. The resulting composition is an excellent water-base paint for exterior surfaces, such as masonry of all types and it is also useful as an exterior topcoat over wood surfaces, especially when the latter is primed with an alkyd resin paint.

It is to be understood that changes and variations may be made without departing from the spirit and scope of the invention as defined in the appended claims.

We claim:

1. A linear addition copolymer of 50 to 96% by weight of an ester of the formula $$CH_2=CHCOO(CH_2)_{n-1}CH_3$$

wherein $n$ is an integer having a value of 1 to 3, 3 to 49% by weight of methoxymethyl vinyl sulfide, and 1 to 20% by weight of a copolymerizable monoethylenically unsaturated monomer having a functional group selected from the group consisting of hydroxyl, carboxyl, amino, amido, and glycidyl.

2. A linear addition copolymer of 50 to 96% by weight of an ester of the formula $$CH_2=CHCOO(CH_2)_{n-1}CH_3$$

wherein n is an integer having a value of 1 to 3, from 1 to 20% by weight of itaconic acid, and 3 to 49% by weight of methoxymethyl vinyl sulfide.

3. A linear addition copolymer of 50 to 96% by weight of an ester of the formula $$CH_2=CHCOO(CH_2)_{n-1}CH_3$$

wherein $n$ is an integer having a value of 1 to 3, from 1 to 20% by weight of methacrylamide, and 3 to 49% by weight of methoxymethyl vinyl sulfide.

4. A linear addition copolymer of 50 to 96% by weight of an ester of the formula $$CH_2=CHCOO(CH_2)_{n-1}CH_3$$

wherein $n$ is an integer having a value of 1 to 3, from 1 to 20% by weight of N-methylol-acrylamide, and 3 to 49% by weight of methoxymethyl vinyl sulfide.

5. An aqueous composition comprising an aqueous medium in which there is dispersed a water-insoluble linear addition copolymer of 50 to 96% by weight of an ester of the formula $$CH_2=CHCOO(CH_2)_{n-1}CH_3$$

wherein $n$ is an integer having a value of 1 to 3, 3 to 49% by weight of methoxymethyl vinyl sulfide, and 1 to 20% by weight of a copolymerizable monoethylenically unsaturated monomer having a functional group selected from the group consisting of hydroxyl, carboxyl, amino, amido, and glycidyl.

6. A composition comprising a mixture of (1) a linear addition copolymer of 50 to 96% by weight of an ester of the formula $$CH_2=CHCOO(CH_2)_{n-1}CH_3$$

wherein $n$ is an integer having a value of 1 to 3, 3 to 49% by weight of methoxymethyl vinyl sulfide, and 1 to 20% by weight of a copolymerizable monoethylenically unsaturated monomer having a functional group selected from the group consisting of hydroxyl, carboxyl, amino, amido, and glycidyl, and (2) from 1 to 25% by weight, based on the weight of copolymer, of a polyfunctional agent reactive with the functional groups of the copolymer and selected from the group consisting of aliphatic and aromatic polyisocyanates, polyepoxides, and condensates of formaldehyde with a member selected from the group consisting of phenol, urea, N,N'-ethyleneurea, and melamine.

7. An aqueous composition comprising an aqueous medium in which there is dispersed (1) a water-insoluble linear addition copolymer of 50 to 96% by weight of an ester of the formula $$CH_2=CHCOO(CH_2)_{n-1}CH_3$$

wherein $n$ is an integer having a value of 1 to 3, 3 to 49% by weight of methoxymethyl vinyl sulfide, and 1 to 20% by weight of a copolymerizable monoethylenically unsaturated monomer having a functional group selected from the group consisting of hydroxyl, carboxyl, amino, amido, and glycidyl, and (2) a water-soluble polyepoxide.

8. An aqueous composition comprising an aqueous medium in which there is dispersed (1) a water-insoluble linear addition copolymer of 50 to 96% by weight of an ester of the formula $$CH_2=CHCOO(CH_2)_{n-1}CH_3$$

wherein $n$ is an integer having a value of 1 to 3, 3 to 49% by weight of methoxymethyl vinyl sulfide, and 1 to 20% by weight of a copolymerizable monoethylenically unsaturated monomer having a functional group selected from the group consisting of hydroxyl, carboxyl, amino, amido, and glycidyl, and (2) a water-soluble condensate of formaldehyde with melamine.

9. An aqueous composition comprising an aqueous medium in which there is dispersed (1) a water-insoluble linear addition copolymer of 50 to 96% by weight of an ester of the formula $$CH_2=CHCOO(CH_2)_{n-1}CH_3$$

wherein $n$ is an integer having a value of 1 to 3, 3 to 49% by weight of methoxymethyl vinyl sulfide, and 1 to 20% by weight of a copolymerizable monoethylenically unsaturated monomer having a functional group selected from the group consisting of hydroxyl, carboxyl, amino, amido, and glycidyl, and (2) a water-soluble condensate of formaldehyde with urea.

10. An aqueous composition comprising an aqueous medium in which there is dispersed (1) a water-insoluble linear addition copolymer of 50 to 96% by weight of an ester of the formula $$CH_2=CHCOO(CH_2)_{n-1}CH_3$$

wherein $n$ is an integer having a value of 1 to 3, 3 to 49% by weight of methoxymethyl vinyl sulfide, and 1 to 20% by weight of a copolymerizable monoethylenically unsaturated monomer having a functional group selected from the group consisting of hydroxyl, carboxyl, amino, amido, and glycidyl, and (2) a water-soluble condensate of formaldehyde with N,N'-ethyleneurea.

11. A solution in an organic solvent of a linear addition copolymer of 50 to 96% by weight of an ester of the formula $$CH_2=CHCOO(CH_2)_{n-1}CH_3$$

wherein $n$ is an integer having a value of 1 to 3, 3 to 49% by weight of methoxymethyl vinyl sulfide, and 1 to 20% by weight of a copolymerizable monoethylenically unsaturated monomer having a functional group selected from the group consisting of hydroxyl, carboxyl, amino, amido, and glycidyl, containing 1 to 25% by weight, based on the weight of the copolymer, of a polyisocyanate.

12. A method which comprises applying a dispersion of a linear addition copolymer of 50 to 96% by weight of an ester of the formula $$CH_2=CHCOO(CH_2)_{n-1}CH_3$$

wherein $n$ is an integer having a value of 1 to 3, 3 to 49% by weight of methoxymethyl vinyl sulfide, and 1 to 20% by weight of a copolymerizable monoethylenically unsaturated monomer having a functional group selected from the group consisting of hydroxyl, carboxyl, amino, amido, and glycidyl, to a solid substrate and then drying and heating the substrate to a temperature of 240° to 750° F.

13. A method as defined in claim 12 in which the substrate is a textile and the application involves impregnation thereof with the dispersion.

14. A method as defined in claim 12 in which the substrate is a paper and the application involves coating thereof with the dispersion.

15. A method as defined in claim 12 in which the substrate is a leather and the application involves coating thereof with the dispersion.

16. A method as defined in claim 12 in which the substrate is an asbestos-cement sheet and the application involves coating thereof with the dispersion.

17. A method of coloring a solid substrate which comprises applying to the substrate an aqueous dispersion containing water, a pigment suspended therein, and a binder comprising (1) a copolymer of 50 to 96% by weight of an ester of the formula $$CH_2=CHCOO(CH_2)_{n-1}CH_3$$

wherein $n$ is an integer having a value of 1 to 3, 3 to 49% by weight of methoxymethyl vinyl sulfide, and 1 to 20% by weight of a copolymerizable monoethylenically unsaturated monomer having a functional group selected from the group consisting of hydroxyl, carboxyl, amino, amido, and glycidyl, and (2) from 1 to 25% by weight, based on the weight of copolymer, of a polyfunctional agent reactive with the functional groups of the copolymer, and then drying and heating the substrate at a temperature of 240° to 750° F. to insolubilize the binder on the substrate.

18. An article of manufacture comprising a solid substrate carrying on at least a portion of the surface thereof a deposit of a linear addition copolymer of 50 to 96% by weight of an ester of the formula $$CH_2=CHCOO(CH_2)_{n-1}CH_3$$

wherein $n$ is an integer having a value of 1 to 3, 3 to 49% by weight of methoxymethyl vinyl sulfide, and 1 to 20% by weight of a copolymerizable monoethylenically unsaturated monomer having a functional group selected from the group consisting of hydroxyl, carboxyl, amino, amido, and glycidyl.

19. An article of manufacture comprising a solid substrate carrying on at least a portion of the surface thereof a deposit of a coating composition comprising (1) a copolymer of 50 to 96% by weight of an ester of the formula $$CH_2=CHCOO(CH_2)_{n-1}CH_3$$

wherein $n$ is an integer having a value of 1 to 3, 3 to 49% by weight of methoxymethyl vinyl sulfide, and 1 to 20% by weight of a copolymerizable monoethylenically unsaturated monomer having a functional group selected from the group consisting of hydroxyl, carboxyl, amino, amido, and glycidyl, and (2) from 1 to 25% by weight, based on the weight of copolymer, of a polyfunctional agent reactive with the functional groups of the copolymer.

20. An article as defined in claim 19 in which the substrate is a textile and the deposit contains a pigment.

References Cited in the file of this patent

UNITED STATES PATENTS

| | | |
|---|---|---|
| 2,752,269 | Condo | June 26, 1956 |
| 2,828,220 | McWherter et al. | Mar. 25, 1958 |
| 2,873,211 | Roeser | Feb. 10, 1959 |
| 2,879,181 | Aenishaenslin et al. | Mar. 24, 1959 |
| 2,933,460 | Richter et al. | Apr. 19, 1960 |